United States Patent
Odler

[11] Patent Number: 5,851,282
[45] Date of Patent: Dec. 22, 1998

[54] PORTLAND CEMENT CLINKER AND USE THEREOF

[76] Inventor: Ivan Odler, 16 Olde Village Dr., Winchester, Mass. 01890

[21] Appl. No.: 849,641
[22] PCT Filed: Nov. 17, 1995
[86] PCT No.: PCT/DE95/01621
  § 371 Date: Jul. 18, 1997
  § 102(e) Date: Jul. 18, 1997
[87] PCT Pub. No.: WO96/15996
  PCT Pub. Date: May 30, 1996

[30] Foreign Application Priority Data

Nov. 23, 1994 [GB] United Kingdom .......... P 44 41 614.8

[51] Int. Cl.$^6$ .............. C04B 7/04; C04B 11/00
[52] U.S. Cl. .......... 106/733; 106/709; 106/735; 106/736; 106/739; 106/763; 106/765; 106/767; 106/768; 106/772; 106/775
[58] Field of Search ................ 106/733, 735, 106/736, 739, 763, 765, 767, 768, 772, 775, 709

[56] References Cited

U.S. PATENT DOCUMENTS 4,036,657  7/1977  Mehta ........................ 106/757
4,042,408  8/1977  Murray et al. .............. 106/744
5,356,472  10/1994  Odler ........................ 106/734

FOREIGN PATENT DOCUMENTS 4204227  2/1993  Germany .
93/21122  10/1993  WIPO .

OTHER PUBLICATIONS

Gimenez et al "Production of cement requiring low energy expenditure", Zement–Kalk–Gips, pp. 12–15 Jan. 1991.

*Primary Examiner*—Anthony Green
*Attorney, Agent, or Firm*—John F. A. Earley; John F. A. Earley III; Harding, Earley, Follmer & Frailey

[57] ABSTRACT

A Portland cement clinker free of $C_4A_3\bar{S}$ having the following proportions of clinker phases, in % by wt.:

—$C_3S$: 40 to 80

—$C_4AF$: <20

—$C_2S$: <30

—$C_3A$: <20 and a $SO_3$ content from 1.0 to 3.0% by wt., based on the clinker, obtained by burning a mixture of raw materials containing CaO, $SiO_2$, $Al_2O_3$, $Fe_2O_3$ and an additive containing $SO_3$ at temperatures from 1200° to 1350° C. centigrade, the use thereof and a Portland cement.

11 Claims, No Drawings

PORTLAND CEMENT CLINKER AND USE THEREOF

The invention concerns a Portland cement clinker, the use thereof and a Portland cement. Portland cement usually consists of a Portland cement clinker and a sulphate carrier, normally gypsum.

A Portland cement clinker is made from a mixture of raw materials containing mainly certain proportions of calcium oxide (CaO), silica ($SiO_2$), alumina ($Al_2O_3$) and iron oxide ($Fe_2O_3$). New compounds, the so-called clinker phases, are formed therefrom by heating the mixture up to sintering. Their typical quantities, in percent by weight, may be given as follows:

—$C_3S$ (3 CaO x $SiO_2$) 40 to 80

—$C_2S$ (2 CaO x $SiO_2$)<30

—$C_4AF$ (4 CaO x $Al_2O_3$ x $Fe_2O_3$) 4 to 15

—$C_3A$ (3 CaO x $Al_2O_3$) 7 to 15

The cement mixed with water and hardened has its strength due to the clinker phase $C_3S$.

Producing the cement clinker requires a considerable expenditure of energy. The latter consists partly of thermal losses in burning (particularly by radiation, exhaust gas losses and hot clinker outputted at the end of the furnace). Another portion of energy is consumed in endothermal reactions, especially in the decomposition of calcium carbonate (important CaO carrier) into calcium oxide.

Accordingly, one endeavors to decrease the energy costs.

First, it seemed to be logic that this goal could be achieved most simply by decreasing the proportion of CaO- rich clinker phases ($C_3A$, $C_3S$) and increasing the proportion of the content of the phases with less CaO ($C_2S$, $C_4AF$) accordingly.

However, the disadvantage would be that the corresponding cement would fall far behind the usual Portland cements in its development of strength, because the hydration of $C_2S$ and $C_4AF$ proceeds much more slowly than that of $C_3S$ and $C_3A$.

In this context, it was attempted to replace the clinker phase $C_3S$ by $C_4A_3\overline{S}$ (wherein $\overline{S}$ stands for $SO_3$), because $C_4A_3\overline{S}$ hydrates relatively fast. In this case, a separate addition of a sulphate carrier into the mixture of raw materials is necessary, the largest part of the sulphate (expressed as $SO_3$) becoming bound within the phase $C_4A_3\overline{S}$.

With this known cement (clinker), it is disadvantageous that $C_3S$ is not formed at all in the burning process, because the formation to $C_3S$ is hindered or prevented by the presence of the sulphates ($SO_3$). "Zement-Kalk-Gips, 4/1990, p. 199" already describes that the $C_3S$ (alite) content decreases with an increasing $SO_3$ content in the clinker. Additionally, at burning temperatures as low as about 1250° to 1300° centigrade required for the formation of $C_4A_3\overline{S}$ no $C_3S$ is formed in the presence of the high $SO_3$ proportions (3–10% by wt.) required for the formation of $C_4A_3\overline{S}$. An increase of temperature is out of the question, because then $C_4A_3\overline{S}$ becomes unstable and cannot be formed any more.

The DE 42 04 227 C1 describes a Portland cement clinker having a $SO_3$ content of 3–8% by wt. In addition to $C_4A_3\overline{S}$ it contains also 30–80% by wt. $C_3S$. The synthesis of this clinker is achieved by addition of a F⁻ containing additive to the mixture of raw materials. In addition to thermal energy also electrical energy is required for the grinding of the clinker.

The object of the invention is to provide a Portland cement, the clinker of which is produceable at lower burning temperatures and grindable with decreased expenditure of energy than for a conventional Portland cement, the Portland cement formed therefrom showing, after mixing with water, a development of strength which at least equals that of a conventional Portland cement.

Surprisingly, it was found that such a Portland cement clinker is produceable with a $C_3S$ content from 40 to 80% by wt. and can be burned at low temperatures of 1250° to 1350°, if a $SO_3$ containing additive is mixed into the mixture of raw materials, the $SO_3$ content of the clinker having to be >1.0 to <3.0% by wt. The addition of an additive containing flourine (e.g. $CaF_2$ or ZnO) for the acceleration of the burning process is not necessary but possible.

The following advantages result:

By a lower burning temperature the consumption of energy for the clinker production decreases.

The clinker may have higher values of free lime than the clinker burned at higher temperatures, but with the clinker (cement) according to the invention even contents of up to 5.0% by wt. of CaO do not lead to appearances of unsoundness during setting or to losses in strength. Obviously, this is connected with the increased reactivity of the CaO formed at lower temperatures, which, before the setting process, reacts to $Ca(OH)_2$ and is therefore harmless. With the same lime saturation factor and the same grinding fineness a higher initial strength of the clinker (cement) with regard to conventional Portland cements was found. A part of the calcium oxide necessary for the formation of the clinker phases is added by the sulphate carrier, for example anhydrite ($CaSO_4$), instead of the calcium carbonate, whereby, with the same lime standard, the energy consumption further decreases.

All important advantage is the high (total) porosity of the clinker, which leads to an easy, energy saving and therefore inexpensive grind. It is usually higher than 8.0 percent by volume.

The development of strength is higher than in the usual Portland cements.

The total $SO_3$ content of the cement should to be from 2 to 4% by wt.

A cement clinker having the following portions of clinker phases, in % by wt., is preferred:

—$C_3S$: ~70 (65–75)

—$C_2S$: ~10 (7–13)

—$C_4AF$: ~10 (7–13)

—$C_3A$: ~10 (7–13)

A preferred $SO_3$ content in the clinker can be given with 1.5 to 2.5% by wt., based on the clinker.

The necessary $SO_3$ containing component is preferably added in the form of a calcium sulphate carrier. This carrier may be gypsum or anhydrite. But it is also possible to use sulphite and/or sulphate containing industrial residues, like an ash from a fluidized-bed combustion and/or a stabilisate from the flue gas desulfurization. By adding a sulphite containing product a further saving of fuel results, because the oxidation of sulphite to sulphate is an exothermic process.

The respective calcium sulphate carriers may also be used for the production of the finished Portland cement from the described clinker.

To optimize the setting reaction an advantageous embodiment proposes to grind the clinker to a specific surface area of 2500 to 4000 cm²/g (according to Blaine), wherein the grinding can be effected with little expenditure of energy or a shorter grinding time due to the high porosity of the clinker.

The lower consumption of fuel being possible with the production of the clinker according to the invention has already been pointed out. It was shown by experiments that the consumption of energy decreases by up to 10%.

Furthermore the lining of the furnace (rotary kiln) is worn less because of the lower burning temperature. This also affects the costs advantageously..

Finally, less molten phase develops in burning the clinker (also due to the low burning temperature), which results in the described high porosity clinker. The improved grindability results in a saving of energy in grinding, which may be up to 50%.

As well, harmful emissions, for example emissions of $CO_2$ and $NO_x$, are reduced by the lower burning temperatures. Industrial residues containing sulfur like ashes from fluidized-bed combustion may also be processed as component of the raw meal.

The invention will be explained below in more detail by various embodiments.

Sample 1 describes a sulphobelitic cement which is $C_3S$ free but has a $C_4A_3\bar{S}$ proportion of 20% by wt.

Sample 2 describes a cement according to the invention which is free from $C_4A_3\bar{S}$.

Sample 3 concerns a cement according to DE 42 04 227 C1.

The proportions of the clinker phases, the $SO_3$ content of the clinker, the selected burning temperature and the total $SO_3$ content of the cement as well as the values of the compressive strength after 1, 3, 7, 28 and 365 days are indicated in table 1 below.

As a result, the samples according to the invention have a clearly improved initial strength, and, partly, also the further development of strength is drastically higher than that of the comparative sample 1.

In order to show clearly the advantages achievable by the Portland cement according to the invention, a conventional Portland cement which was burned at 1480° centigrade is indicated as sample 4.

The improved development of strength results in the following advantages with regard to the known Portland cements:

Production of cements of higher value with the same lime saturation factor and grinding fineness.

Grinding to a smaller specific surface area with the same development of strength.

Production of blended cements with good development of strength or a higher content of grinding additives.

I claim:

1. A Portland cement clinker, free of $C_4A_3\bar{S}$, having the following proportions of clinker phases, in % by wt.:

—$C_3S$: 40 to 80

—$C_4AF$:<20

—$C_2S$:<30

—$C_3A$:<20 and a $SO_3$ content from 1.0 to 3.0% by wt., based on the clinker, obtained by burning a mixture of raw materials containing CaO, $SiO_2$, $Al_2O_3$, $Fe_2O_3$, and an additive containing $SO_3$ at a temperature from 1200° centigrade to 1350° centigrade.

2. The Portland cement clinker according to claim 1 having a $SO_3$ content from 1.5 to 2.5% by wt., based on the clinker.

3. The Portland cement clinker according to claim 1, wherein the additive containing $SO_3$ was added in the form of a calcium sulphate carrier.

4. The Portland cement clinker according to claim 3, wherein the additive containing $SO_3$ was added in the form of gypsum, anhydrite and/or industrial residues.

5. The Portland cement clinker according to claim 1, wherein the proportions of the $C_2S$ and $C_3A$ clinker phases add up to less than 5% by wt.

6. The Portland cement clinker according to claim 1 having a content of free CaO from. 0.5 to 5.0% by wt.

7. The Portland cement clinker according to claims 1 having a total open porosity >8% by vol.

8. The Portland cement clinker according to claim 4, comprising an ash from a fluidized-bed combustion and/or a stabilisate from a flue gas desulfurization as an industrial residue.

9. A Portland cement comprising a Portland cement clinker, the Portland cement clinker being free of $C_4A_3\bar{S}$ and having the following proportions of clinker phases in % by wt.:

—$C_3S$: 40 to 80

—$C_4AF$:<20

—$C_2S$<30

—$C_3A$:<20 and a $SO_3$ content from 1.0 to 3.0% by wt., based on the clinker, obtained by burning a mixture of raw materials containing CaO, $SiO_2$, $Al_2O_3$, $Fe_2O_3$, and an additive containing $SO_3$ at a temperature from 1200° centigrade to 1350° centigrade,

TABLE 1

| | clinker phases (% by wt.) | | | | | $SO_3$ in the clinker | burning | total $SO_3$ | compressive strength (N/mm²) | | | | |
|---|---|---|---|---|---|---|---|---|---|---|---|---|---|
| Nr. | $C_3S$ | $C_2S$ | $C_3A$ | $C_4A_3\bar{S}$ | $C_4AF$ | (% by wt.) | temperature | (% by wt.) | 1 d | 3 d | 7 d | 28 d | 365 d |
| 1 | 0 | 60 | 0 | 20 | 20 | 7.5 | 1200 | 14.5 | 21.0 | 27.0 | 29.0 | 32.5 | 77.5 |
| 2 | 80 | 0 | 10 | 0 | 10 | 2.9 | 1280 | 3.9 | 47.2 | 59.0 | 67.0 | 73.7 | 89.9 |
| 3 | 40 | 0 | 0 | 30 | 30 | 5.9[1)] | 1250 | 16 | 36.0 | 37.0 | 43.5 | 46.5 | 49.0 |
| 4 | 80 | 0 | 10 | 0 | 10 | 0.0 | 1480 | 2 | 21.5 | 49.7 | 72.5 | 81.5 | 85.0 |

[1)]0.5% by wt. of $CaF_2$ was added to the mixture of raw materials of these samples the Portland cement further including up to 2% by wt. of SO$_3$ in the form of gypsum and/or anhydrite, the Portland cement having a specific surface area according to Blaine from 2,500 to 4,000 cm$^2$/g.

10. A Portland cement comprising, a Portland cement clinker having the following proportions of clinker phases, in percent by wt.:

—AS: 40 to 80

—C$_4$AF:<20

—C$_2$S:<30

—C$_3$A:<20 and a SO$_3$ content from 1.0 to 3.0% by wt., based on the clinker, obtained by burning a mixture of raw materials containing CaO, Sio$_2$, Al$_2$O$_3$, Fe$_2$O$_3$ and an additive containing SO$_3$ at temperatures from 1200° to 1350° centigrade, the SO$_3$ content being from 1.5 to 2.5% by wt., based on the clinker, the additive containing SO$_3$ being a calcium sulphate carrier selected from gypsum, anhydrite and/or industrial residues the Portland cement clinker being free of C$_4$A$_3\overline{\text{S}}$, wherein the proportions of the C$_2$S and C$_3$A clinker phases add up to less than 5% by wt., the Portland cement clinker having a content of free CaO from 0.5 to 5.0% by wt., and the Portland cement clinker having a total open porosity >8% by vol., and up to 2% by wt. of SO$_3$ in the form of gypsum and/or anhydrite, having, a specific surface area according to Blaine from 2500 to 4000 cm$^2$/g.

11. A method of producing a blended cement, comprising the steps of forming a Portland cement clinker having the following proportions of clinker phases, in percent by wt.:

—C$_3$S: 40 to 80

—C$_4$AF:<20

—C$_2$S:<30

—C$_3$A:<20 and a SO$_3$ content from 1.0 to 3.0% by wt., based on the clinker, obtained by burning a mixture of raw materials containing CaO, SiO$_2$, Al$_2$O$_3$, Fe$_2$O$_3$ and an additive containing SO$_3$ at temperatures from 1200° to 1350° centigrade, the SO$_3$ content being from 1.5 to 2.5% by wt., based on the clinker, the additive containing SO$_3$ being a calcium sulphate carrier selected from gypsum, anhydrite and/or industrial residues the Portland cement clinker being free of C$_4$A$_3\overline{\text{S}}$, wherein the proportions of the C$_2$S and C$_3$A clinker phases add up to less than 5% by wt., the Portland cement clinker having a content of free CaO from 0.5 to 5.0% by wt., and the Portland cement clinker having a total open porosity >8% by vol., and adding to the Portland cement clinker granulated blast-furnace slag, pozzolans or other latent hydraulic materials individually or in blends.

* * * * *